(12) United States Patent
Komiya et al.

(10) Patent No.: US 11,702,154 B2
(45) Date of Patent: Jul. 18, 2023

(54) WORK VEHICLE

(71) Applicant: YANMAR POWER TECHNOLOGY CO., LTD., Osaka (JP)

(72) Inventors: Toshitaka Komiya, Osaka (JP); Tetsuya Iida, Osaka (JP); Shimpachi Fushimi, Osaka (JP); Takashi Goto, Osaka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 394 days.

(21) Appl. No.: 16/976,916

(22) PCT Filed: Mar. 1, 2019

(86) PCT No.: PCT/JP2019/008105
§ 371 (c)(1),
(2) Date: Aug. 31, 2020

(87) PCT Pub. No.: WO2019/176588
PCT Pub. Date: Sep. 19, 2019

(65) Prior Publication Data
US 2021/0009213 A1    Jan. 14, 2021

(30) Foreign Application Priority Data

Mar. 14, 2018    (JP) ................................ 2018-046590
Nov. 28, 2018    (JP) ................................ 2018-222259

(51) Int. Cl.
*B62D 49/00*    (2006.01)
*B62D 25/16*    (2006.01)
(Continued)

(52) U.S. Cl.
CPC ........... *B62D 49/00* (2013.01); *B62D 25/163* (2013.01); *A01C 11/02* (2013.01); *B60Y 2200/221* (2013.01); *B62D 25/082* (2013.01)

(58) Field of Classification Search
CPC .... B62D 49/00; B62D 25/163; B62D 25/082; B60Y 2200/221; A01C 11/02
(Continued)

(56) References Cited

U.S. PATENT DOCUMENTS 9,313,948 B2 *    4/2016    Moriguchi .............. B60L 53/80
2018/0118134 A1    5/2018    Komiya et al.

FOREIGN PATENT DOCUMENTS

EP        3193232 A2 *    7/2017    .......... B60R 21/131
JP        1981-093382 U    7/1981
(Continued)

OTHER PUBLICATIONS

International Search Report for PCT Patent App. No. PCT/JP2019/008105 (dated Apr. 23, 2019).

*Primary Examiner* — Joseph D. Pape
*Assistant Examiner* — Dana D Ivey
(74) *Attorney, Agent, or Firm* — Cermak Nakajima & McGowan LLP; Tomoko Nakajima

(57) ABSTRACT

A work vehicle includes an driver's seat disposed in the rear region of a vehicle body, a left and a right fender that are disposed on the left and right laterally outward sides of the driver's seat, and a partition wall that divides, at a position behind the driver's seat, the vehicle body into a front region of the vehicle body on the front side of the partition wall and a rear region of the vehicle body on the back side thereof. Operation tools for operating working equipment provided on the vehicle body are disposed on one of the fenders, and the partition wall is provided offset toward a side where operation tools are disposed relative to the driver's seat.

5 Claims, 15 Drawing Sheets

(51) Int. Cl.
*B62D 25/08* (2006.01)
*A01C 11/02* (2006.01)

(58) Field of Classification Search
USPC .......................................................... 296/198
See application file for complete search history.

(56) References Cited

FOREIGN PATENT DOCUMENTS

| | | |
|---|---|---|
| JP | 2017-114329 A | 6/2017 |
| WO | 2016/189940 A1 | 12/2016 |

\* cited by examiner

WORK VEHICLE

This application is a national phase entry under 35 U.S.C. § 371 of PCT Patent Application No. PCT/JP2019/008105, filed on Mar. 1, 2019, which claims priority under 35 U.S.C. § 119 to Japanese Patent Application No. 2018-046580, filed Mar. 14, 2018 and Japanese Patent Application No. 2018-222259, filed Nov. 28, 2018, all of which are incorporated by reference.

TECHNICAL FIELD

The present invention relates to a work vehicle having a driver's seat disposed in the rear part of a vehicle body, left and right fenders that are disposed on the left and right laterally outer sides of the driver's seat, and a partition wall that divides, at a position behind the driver's seat, the vehicle body into a front region of the vehicle body on the front side of the partition wall and a rear region of the vehicle body on the rear side thereof.

BACKGROUND ART

As the partition wall provided in the work vehicle described above, for example, there is a partition wall for a tractor, which is disclosed in Patent Literature 1. The partition wall disclosed in Patent Literature 1 is mounted across left and right prop frame portions of a protection frame, which is vertically provided on the rear part of the vehicle body. The partition wall is composed of a perforated plate having a length that covers the entire area between both of the prop frame portions of the protection frame.

Further, one of the left and right fenders is provided with a lifting operation lever of a work device lifting mechanism that lifts and lowers a work device via a link mechanism, as an example of an operation tool for operating a working equipment provided in a vehicle body. The other fender is provided with a PTO lever for operating a transmission for a PTO shaft, as an example of the operation tool for operating the working equipment.

Further, in FIGS. 9 and 10 showing another embodiment, an auxiliary partition wall, which covers outward of the vehicle body in the lower half of the backrest of the driver's seat at a corner formed by the front surface of the lower end of both of the prop frame portions of the protection frame and the upper surface of the left and right fenders, is disposed in an orientation along the front-rear direction.

CITATION LIST

Patent Literature

Patent Literature 1: Japanese Unexamined Patent Publication No. 2017-114329

DISCLOSURE OF INVENTION

Problems to be Solved by the Invention

In the work vehicle described above, both of the lateral side spaces between both of the left and right side edge portions in both of the prop frame portions of the protection frame and the backrest of the driver's seat are partitioned by the partition wall that is installed between the prop frame portions of the protection frame. Therefore, it is possible to prevent an operation tool such as the lifting operation lever and the PTO lever provided on both of the fenders from being contacted, or from being operated carelessly, by an operator's hand intruding from the rear region of the vehicle body behind the driver's seat. On the other hand, since the partition wall is configured to have a length that covers the entire area between both of the prop frame portions of the protection frame, there is a problem that the rearward visibility is deteriorated.

Further, the configuration in which the auxiliary partition wall is disposed at the corner formed by the front surface of the lower end of both of the prop frame portions of the protection frame and the upper surface of the left and right fenders aims to prevent intrusion from the rear region of the vehicle body of the driver's seat while rerouting to the lateral outward side of the vehicle body. However, the auxiliary partition wall is disposed in an orientation along the front-rear direction. Therefore, there is room for improvement in terms of shortening the distance of rerouting outward of the vehicle body, and preventing intrusion due to the rerouting.

In consideration of the actual situation, the main object of the present invention is to provide a work vehicle capable of improving rearward visibility while avoiding inadvertent operation of and contact with an operation tool caused by an operator's hand intruding from the rear region of a vehicle body of a driver's seat by the rational placement of the operation tool for operating a working equipment provided in the vehicle body.

Means for Solving the Problems

A first feature structure of the present invention resides in that a work vehicle includes a driver's seat disposed in a rear part of a vehicle body, a left and a right fender disposed on the left and right lateral outer sides of the driver's seat respectively, and a partition wall that divides, at a position behind the driver's seat, a front region of the vehicle body on a front side of the driver's seat, and a rear region of the vehicle body on a rear side of the driver's seat from each other, an operation tool for operating a working equipment provided on the vehicle body is disposed on one of the fenders, and the partition wall is provided offset toward a side, where the operation tool is disposed, relative to the driver's seat.

According to the above configuration, the operation tool for operating the working equipment provided on the vehicle body is collectively disposed on the one fender. Therefore, in the rearward position of the driver's seat, when the partition wall is provided to partition the front region of the vehicle body on the front side of the driver's seat, and the rear region of the vehicle body on the rear side of the driver's seat, the partition wall can be provided offset toward a side, where the operation tool is disposed, relative to the driver's seat. Therefore, it is possible to not only shorten the partition wall by the amount of the offset, but also avoid inadvertent operation of and contact with the operation tool due to an operator's hand intruding from the rear region of the vehicle body through the lateral space on one side of the driver's seat.

Accordingly, due to the rational placement of the operation tool for operating the working equipment collectively disposed on the one fender, it is possible to avoid inadvertent operation of and contact with the operation tool caused by an operator's hand intruding from the rear region of the vehicle body through the lateral space on one side of the driver's seat, and improve rearward visibility by shortening the partition wall.

A second feature structure of the present invention resides in that, on an outer edge side of the partition wall on the side where the operation tool is disposed, a side partition wall is disposed to incline toward the front side of the vehicle body while protruding toward an outer side with respect to the vehicle body farther than the installation position of the operation tool.

According to the above configuration, the side partition wall, which is disposed on the outer edge side on the side where the operation tool is disposed in the partition wall, projects toward the outward side of the vehicle body more than the installation position of the operation tool, and is inclined toward the front side of the vehicle body. Therefore, in order to reroute intrusion to the lateral outward side of the vehicle body from the rear region of the vehicle body of the driver's seat, to the operation tool side, it is necessary to reroute largely toward the front side of the vehicle body outward of the vehicle body. Accordingly, it is possible to suppress an operator's hand from intruding from the rear region of the vehicle body through the lateral space on one side of the driver's seat, and also suppress intrusion from the rear region of the vehicle body to the lateral outward side of the vehicle body by rerouting the operator's hand.

A third feature structure of the present invention resides in that the partition wall is attached in a protection frame vertically provided in the rear part of the vehicle body, and the side partition wall is attached to a prop frame portion of the protection frame on the side where the operation tool is disposed while protruding toward the outer side with respect to the vehicle body farther than the prop column frame.

According to the above configuration, by the amount that the side partition wall projects farther outward of the vehicle body than the prop frame portion of the protection frame, in order to reroute an operator's hand from intruding from the lateral outward side of the vehicle body from the rear region of the vehicle body, to the operation tool side, it is necessary to largely reroute farther outward of the vehicle body than the prop frame portion. Therefore, it is possible to suppress the operator's hand from intruding by rerouting the operator's hand from the rear region of the vehicle body to the lateral outward side of the vehicle body. Further, since the partition wall and the side partition wall are mounted by using the prop frame portion of the protection frame, it is possible to simplify the support structure and to improve the support strength.

A fourth feature structure of the present invention resides in that the partition wall and the side partition wall are each detachable.

According to the above configuration, it is possible to easily perform maintenance for the partition wall and the side partition wall, and also maintenance for the vehicle body side in which the partition wall and the side partition wall are disposed.

A fifth feature structure of the present invention resides in that a protrusion portion is provided on a portion of the side partition wall that faces one of the fenders, the protrusion portion reducing a gap between the portion of the side partition wall and an upper surface of that fender.

According to the above configuration, by providing the gap between the side partition wall and the upper surface of the fender, it is possible to suppress noise generation and deformation due to contact with the side partition wall and the fender having different vibration characteristics, and reduce the gap between the lower end portion of the side partition wall and the upper surface of the fender by the protrusion portion provided at the lower end portion of the side partition wall. Accordingly, it is possible to suppress an operator's hand from intruding the operation portion from the rear region of the vehicle body through the gap below the side partition wall as a bypass passage.

A sixth feature structure of the present invention resides in that the partition wall and the side partition wall are provided at the driver's seat.

According to the above configuration, regardless of the position adjustment of the driver's seat in the front-rear direction, it is possible to maintain a constant placement relationship among the driver's seat, the partition wall disposed at the rearward position of the driver's seat, and the side partition wall that projects obliquely toward the front side of the vehicle body outward of the vehicle body. Accordingly, it is possible to suppress an operator's hand from intruding from the rear region of the vehicle body through the lateral space on one side of the driver's seat, and also suppress the operator's hand from intruding from the rear region of the vehicle body by rerouting the operator's hand to the lateral outward side of the vehicle body.

DESCRIPTION OF EMBODIMENTS

Embodiments of the present invention will be described with reference to the drawings.

First Embodiment

Figure 1:
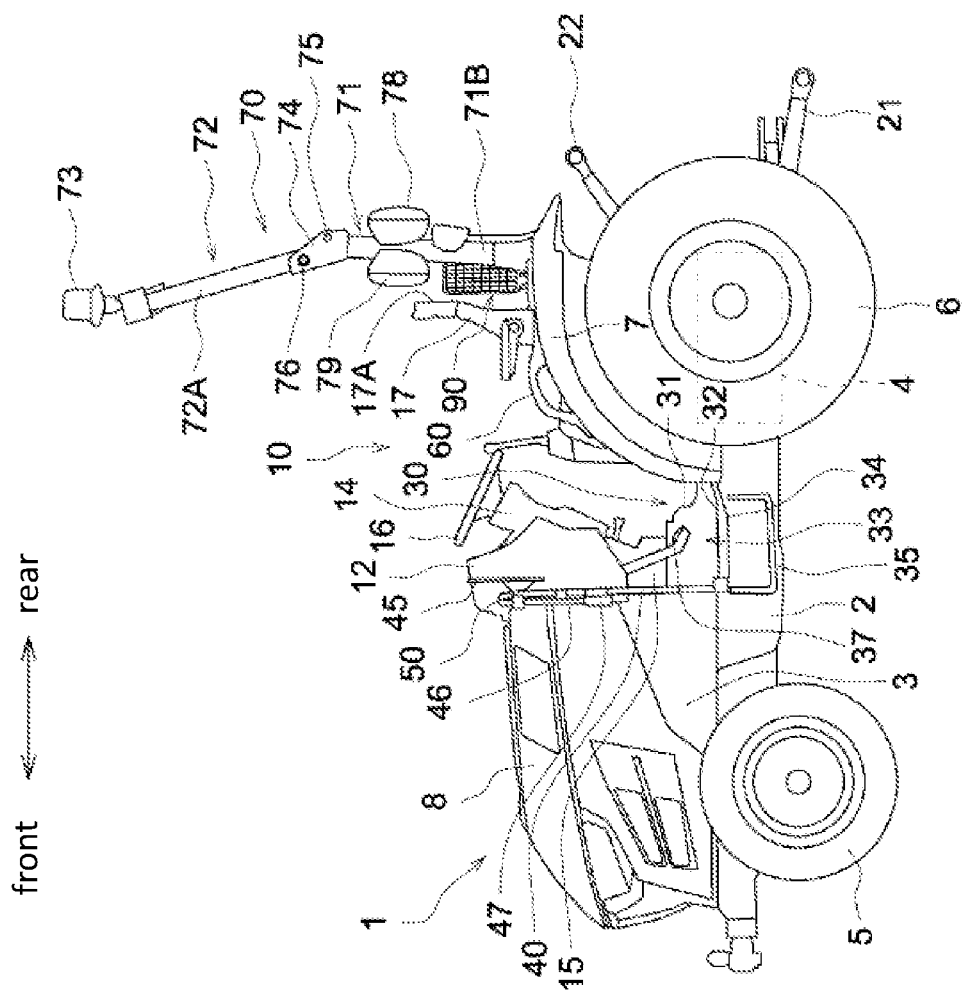
FIG. 1 is an overall side view of a tractor which is an example of a work vehicle.
Figure 2:
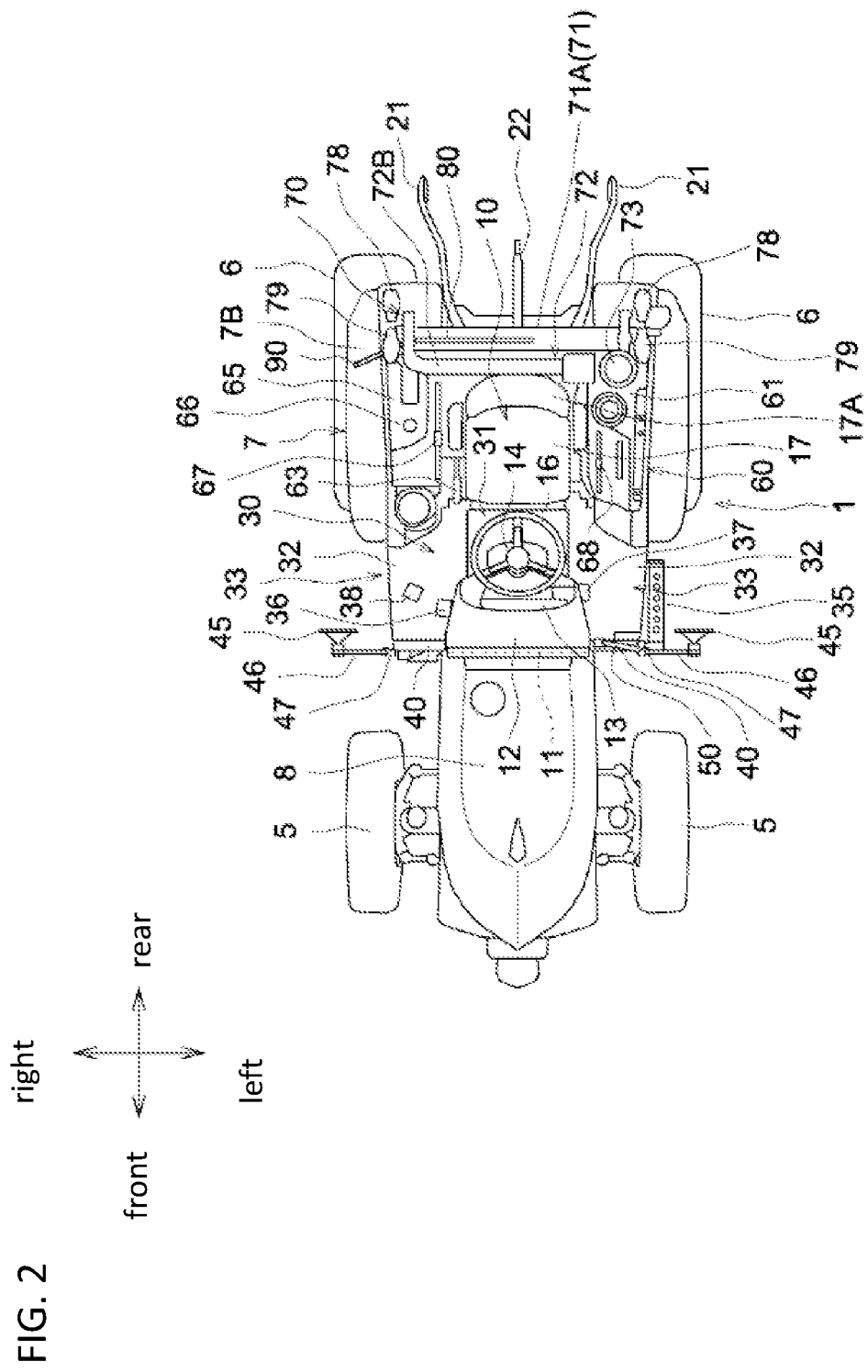
FIG. 2 is an overall plan view of the tractor.
Figure 3:
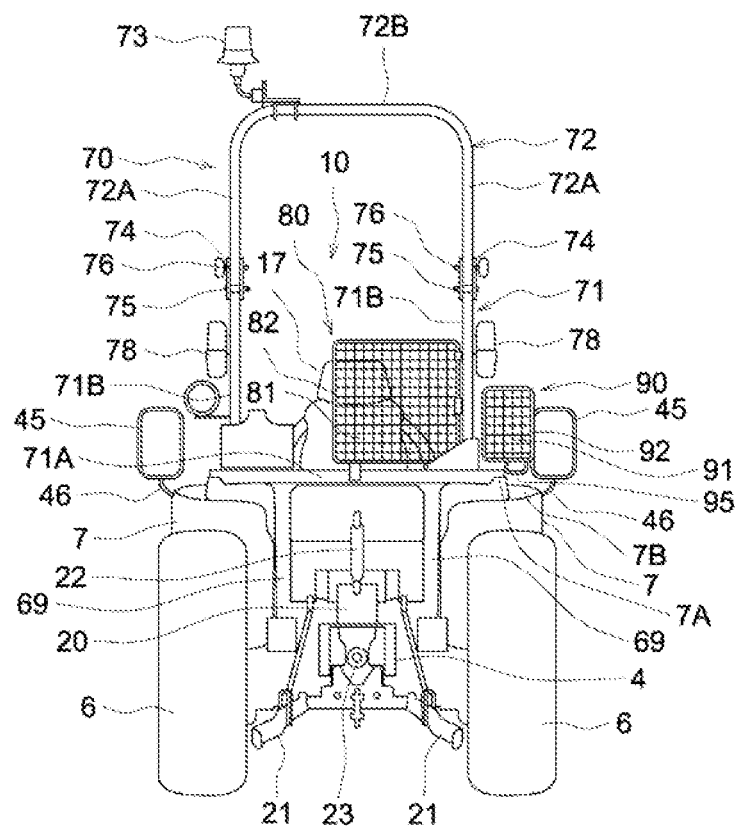
FIG. 3 is an overall rear view of the tractor.

FIGS. 1 to 3 show a tractor 1 of a lops type as an example of a work vehicle according to the present embodiment. In the description of the present embodiment, for convenience, in FIG. 1 showing the side surface of the tractor 1, the left side of the paper surface, which is the front side (front) direction of the tractor 1, is referred to as a front side of the vehicle body, and the right side of the paper surface is referred to as a rearward (back) side of the vehicle body.

Further, in FIG. 2 showing a plane of the tractor 1, the lower side of the paper surface is referred to as a left side of the vehicle body, and the upper side of the paper surface is referred to as a right side of the vehicle body.

As shown in FIGS. 1 to 3, the tractor 1 is provided with an engine portion 3 including an engine and the like on the front region of a machine body frame 2, which is framed by being stretched in the front-rear direction. A transmission case 4 including a transmission, not shown, for changing the traveling speed of the tractor 1, is disposed in the rear (back) end portion of the machine body frame 2. Left and right front wheels 5 are disposed as front traveling units on the front region of the machine body frame 2. Left and right rear wheels 6 are disposed as rear traveling units on the rear region of the machine body frame 2. Fenders 7 are provided to cover the left and right rear wheels 6 from the upper side and the inward side of the vehicle body in the left-right direction of the vehicle body, respectively. Note that the tractor 1 may be implemented in a form in which a crawler is used as the traveling unit.

As shown in FIGS. 1 and 2, the tractor 1 includes a driving portion 10 on the rearward of a hood 8 that covers the engine portion 3. Specifically, in the rear part of the hood 8, a hot air shield plate 11 (see FIGS. 2 and 5) is vertically provided from the machine body frame 2 in a state in which the engine portion 3 and the driving portion 10 are shielded from each other. A dashboard 12 is provided on the hot air shield plate 11. The dashboard 12 is provided with an instrument panel 13 serving as a display unit that displays a speed, a remaining amount of fuel, and the like. A steering column cover 15 covering a steering column 14 is provided on the rearward of the dashboard 12. A steering wheel (steering handle) 16 is provided at the upper end of the steering column cover 15 so as to project from the steering column cover 15, and be supported by a steering shaft (not shown) of the steering column 14.

As shown in FIGS. 1 and 2, a driver's seat 17 is provided on the rearward of the steering column cover 15 at a predetermined distance. The driver's seat 17 is disposed between the left and right fenders 7. As shown in FIG. 3, a hydraulic work device lifting mechanism 20 for lifting and lowering a work device (not shown) such as a rotary tilling device is mounted on the rear upper surface of the transmission case 4 disposed below the driver's seat 17. As shown in FIGS. 1 to 3, the work device is connected to the rearward of the transmission case 4 of the tractor 1 via a three-point link mechanism including a pair of left and right lower links 21, and a top link 22. The front end portions of the left and right lower links 21 are rotatably connected to the left and right side surfaces of the rear part of the transmission case 4, respectively. The front end portion of the top link 22 is rotatably connected to a rear part of the work device lifting mechanism 20. A power take-off (PTO) shaft 23 for transmitting the driving force of the engine portion 3 to the work device is provided on the rear surface of the transmission case 4, so as to project rearward.

As shown in FIGS. 4 to 7, in the driving portion 10, the driver's step 30 is provided as a floor surface portion on the machine body frame 2 from a position immediately behind the hot air shield plate 11 to a position immediately before the transmission case 4. The driver's step 30 includes a driving portion floor 31, and left and right side steps 32. The driving portion floor 31 is disposed at the left and right central portions in the vehicle body width direction between the steering wheel 16 and the driver's seat 17. The left and right side steps 32 are continuously disposed on the left and right outward sides of the driving portion floor 31 between the front end portions of the left and right fenders 7 and left and right foot guards 40 described below. The left and right side steps 32 constitute boarding sections 33 that allow for boarding and deboarding to and from the driver's step 30 between the front end portions of the left and right fenders 7 and the left and right foot guards 40. Among the left and right boarding sections 33, the boarding section 33 located on the left side of the vehicle body is configured as a main doorway. An auxiliary side step 35 that assists boarding and deboarding is vertically provided in a U shape in a side view, at the outer end portion of a floor frame 34 on the machine body frame 2 side that supports the side step 32 on the main doorway side, and at a lower position than the side step 32.

As shown in FIG. 2, a forward pedal 36 and a reverse pedal 38 are disposed on the right foot portion of the driving portion floor 31 where the right leg of a driver seated on the driver's seat 17 is located. As shown in FIGS. 1 and 2, a brake pedal 37 is disposed to perform a braking operation of a brake device (not shown) for the left and right rear wheels 6 is disposed on the left foot portion where the left foot of a driver seated in the driver's seat 17 is located.

Figure 4:
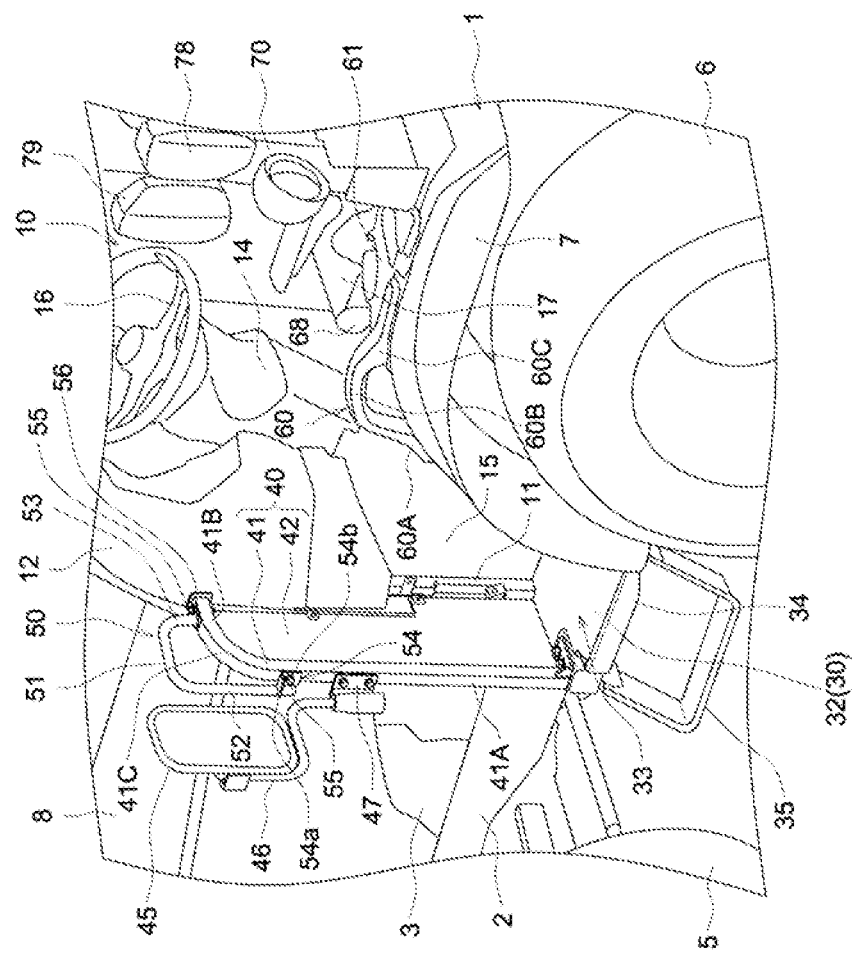
FIG. 4 is a perspective view of a grip structure for boarding and deboarding the tractor from a rear view.
Figure 5:
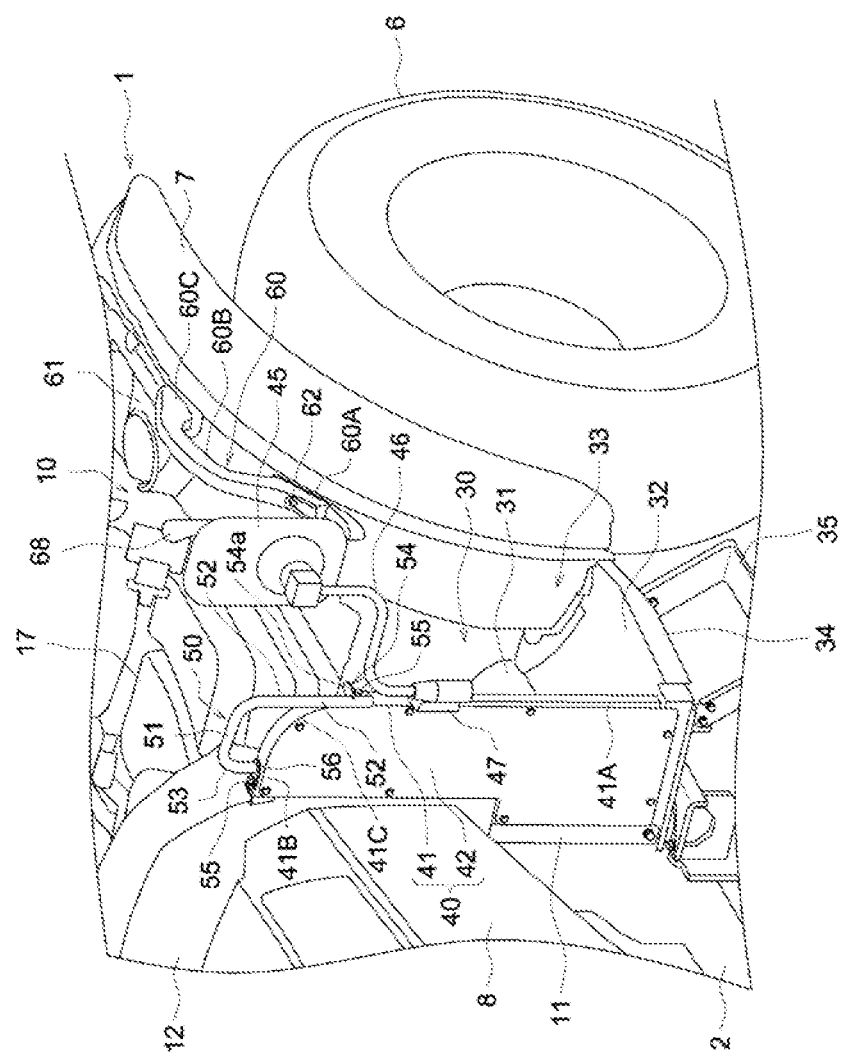
FIG. 5 is a perspective view of the grip structure for boarding and deboarding the tractor from a front view.
Figure 6:
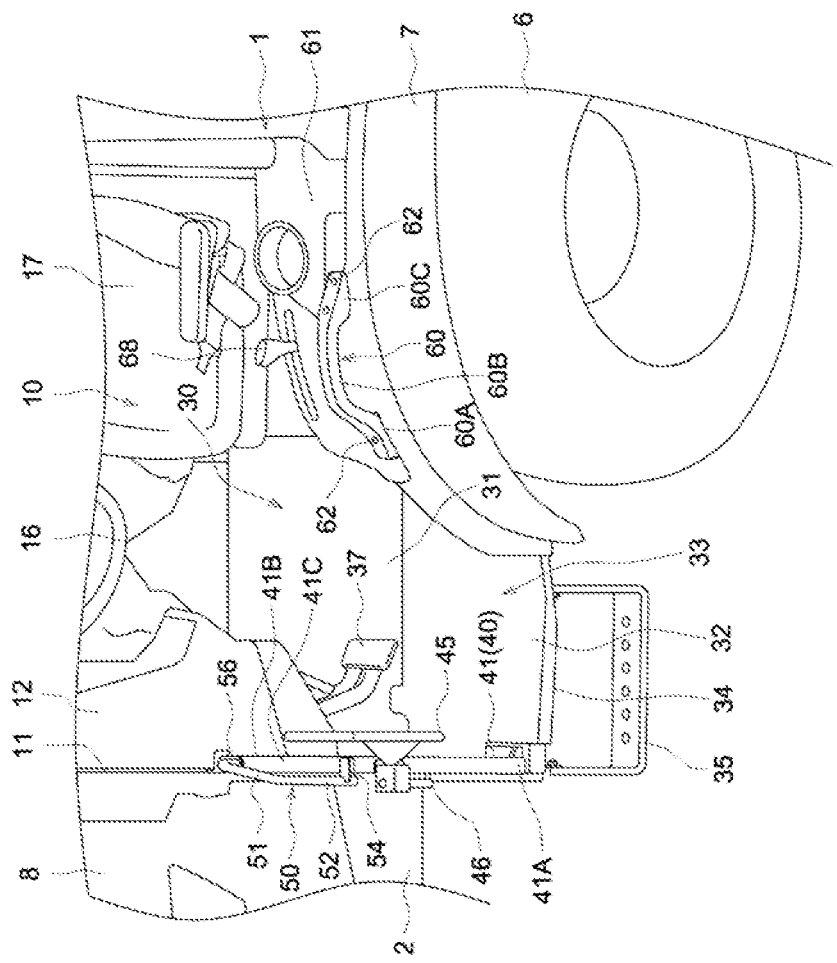
FIG. 6 is a perspective view of the grip structure for boarding and deboarding the tractor from a side view.

As shown in FIGS. 4 to 6, each of the left and right foot guards 40 includes a guard support member 41 having a rectangular tubular shape and formed to be bent in a substantially inverted "L" shape when viewed in the front-rear direction, and a transparent windproof plate 42 covering the front side of the boarding section 33 at the front side position of the guard support member 41. The guard support member 41 is fixedly connected to the upper portions of the left and right outer end edges of the hot air shield plate 11 (see FIG. 2) and the front region of the outer end of the floor frame 34 in an orientation along the left-right direction. The windproof plate 42 is fixedly connected to the guard support member 41, the outer edge of the hot air shield plate 11, and the front end of the floor frame 34. The windproof plate 42 covers, in a transparent manner, a vertical window elongated in the up-down direction, which is formed by the guard support member 41, the outer edge of the hot air shield plate 11, and the front end of the floor frame 34.

A mounting portion 47 is provided for mounting a support arm 46 of a rearview mirror 45 for confirming the rearward, on the upper side of a vertical frame portion 41A that constitutes the side edge portion of the foot guard 40 outward of the vehicle body and disposed in the vertical orientation.

As shown in FIGS. 4 to 7, a first gripping part 50 is provided on the top portion of the foot guard 40 located in the forward portion of the boarding section 33 on the left side of the vehicle, so that a driver can grip with her/his hand on the front side of the vehicle body when boarding and deboarding. A second gripping part 60 is provided on the upper portion of the fender 7 located at the rearward portion of the boarding section 33 on the left side of the vehicle, so that a driver can grip with her/his hand on the rear side of the vehicle body when boarding and deboarding. It is possible to safely and easily board and deboard to and from the boarding section 33 on the left side of the vehicle body by gripping the first gripping part 50 and the second gripping part 60 disposed before and after the boarding section 33.

As shown in FIGS. 4 to 6, the first gripping part 50 includes a horizontal gripping body 51, a vertical gripping body 52, and a vertical mounting body 53. The horizontal gripping body 51 is horizontally or substantially horizontally disposed in an inclined posture that positioned further forward toward the outward side of the vehicle body, in a plan view. The vertical gripping body 52 is continuous to an end portion of the horizontal gripping body 51 outward of the vehicle body. The vertical mounting body 53 is continuous to an end portion of the horizontal gripping body 51 on the inner side of the vehicle body. The horizontal gripping body 51, the vertical gripping body 52, and the vertical mounting body 53 of the first gripping part 50 are continuously formed by bending a round pipe.

The vertical gripping body 52 has a gripping length substantially equal to the gripping length of the horizontal gripping body 51, and extends downward along the vertical frame portion 41A of the foot guard 40 in the vertical orientation. Therefore, the overall length of the vertical gripping body 52 is configured to be longer than the overall length of the horizontal gripping body 51.

As shown in FIGS. 4 to 6, a horizontal plate piece 54a of a lower mounting member 54, which is formed to be bent in an L shape as viewed in the front-rear direction, is fixed to a lower end portion of the vertical gripping body 52 of the first gripping part 50 so as to project toward the rear side of the vehicle body. A vertical plate piece 54b, which is continuous to the horizontal plate piece 54a of the lower mounting member 54, is detachably fixed to the outer surface of the vertical frame portion 41A of the guard support member 41 with a bolt 55. Therefore, as shown in FIGS. 4 to 6, the lower end portion of the vertical gripping body 52 of the first gripping part 50 is disposed in the forward portion of the vertical frame portion 41A of the guard support member 41.

A horizontal plate-shaped upper mounting member 56 is fixed to a lower end portion of the vertical mounting body 53 of the first gripping part 50. The upper mounting member 56 is detachably fixed to the upper surface of a horizontal frame portion 41B that constitutes the upper edge portion of the foot guard 40 with the bolt 55.

Further, as shown in FIGS. 4 to 6, the first gripping part 50 is attached so as to project upward with respect to a bent frame portion 41C that connects the vertical frame portion 41A and the horizontal frame portion 41B of the guard support member 41. Therefore, it is possible to secure a sufficient gripping space between the bent frame portion 41C of the guard support member 41, and the horizontal gripping body 51 and the vertical gripping body 52 of the first gripping part 50.

Figure 7:
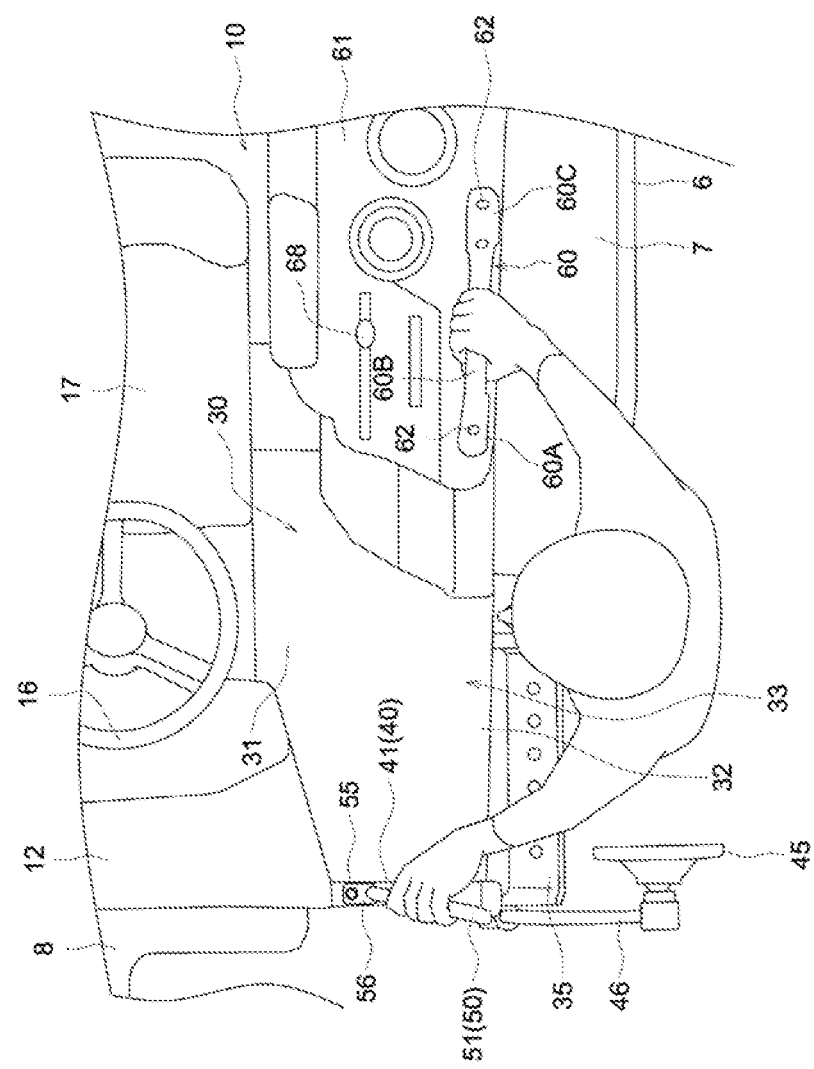
FIG. 7 is an explanatory diagram showing boarding and deboarding state.

Further, the horizontal gripping body 51 of the first gripping part 50 is horizontally or substantially horizontally disposed in a in an inclined posture that positioned further forward toward the outward side of the vehicle body, in a plan view. Therefore, for example, as shown in FIG. 7, when boarding at a right angle along the left-right direction from the lateral outer side position of the vehicle body relative to the boarding section 33 on the left side of the vehicle body, it is possible to easily grip the horizontal gripping body 51 of the first gripping part 50 in a natural orientation in which the left arm on the front side of the vehicle body is slightly open toward the outer side of the human body. Moreover, in the gripping state, the horizontal gripping body 51 of the first gripping part 50 and the left arm have a reasonable crossing angle. Therefore, in boarding, the left hand gripping the horizontal gripping body 51 of the first gripping part 50 is not burdened. Further, by the horizontal gripping body 51 of the first gripping part 50 inclined toward the front side of the vehicle body, the width of the boarding section 33 on the left side of the vehicle body can be visually widened. By improving the grasping operability at the time of boarding and deboarding, and visually improving the width of the boarding section 33 on the left side of the vehicle body, it is possible to easily board from the left-right direction on the lateral outer side of the vehicle body.

Since the horizontal gripping body 51 of the first gripping part 50 is disposed horizontally or substantially horizontally, it is possible to suppress the slipping movement of the gripping position. Further, since the vertical gripping body 52 of the first gripping part 50 is connected to the foot guard 40 in an orientation along the vertical direction, it is possible to assist the up and down movement of a human body up to the height of the driver's step 30.

As shown in FIGS. 4 to 7, the second gripping part 60 is fixed to the upper portion of the fender 7 on the left side of the vehicle body and to the outer portion of a left side column 61 with a screw 62 in an orientation along the front-rear direction. The second gripping part 60 includes a front leg portion 60A, a grip 60B, and a rear leg portion 60C. The front leg portion 60A is fixed to the front region side of the fender 7. The grip 60B extends rearward along the curved upper surface of the fender 7 from the upper end of the front leg portion 60A. The rear leg portion 60C extends downward from the rear end of the grip 60B, and is fixed to the rear part side of the fender 7. The front leg portion 60A, the grip 60B, and the rear leg portion 60C of the second gripping part 60 are integrally molded of a resin.

Figure 9:
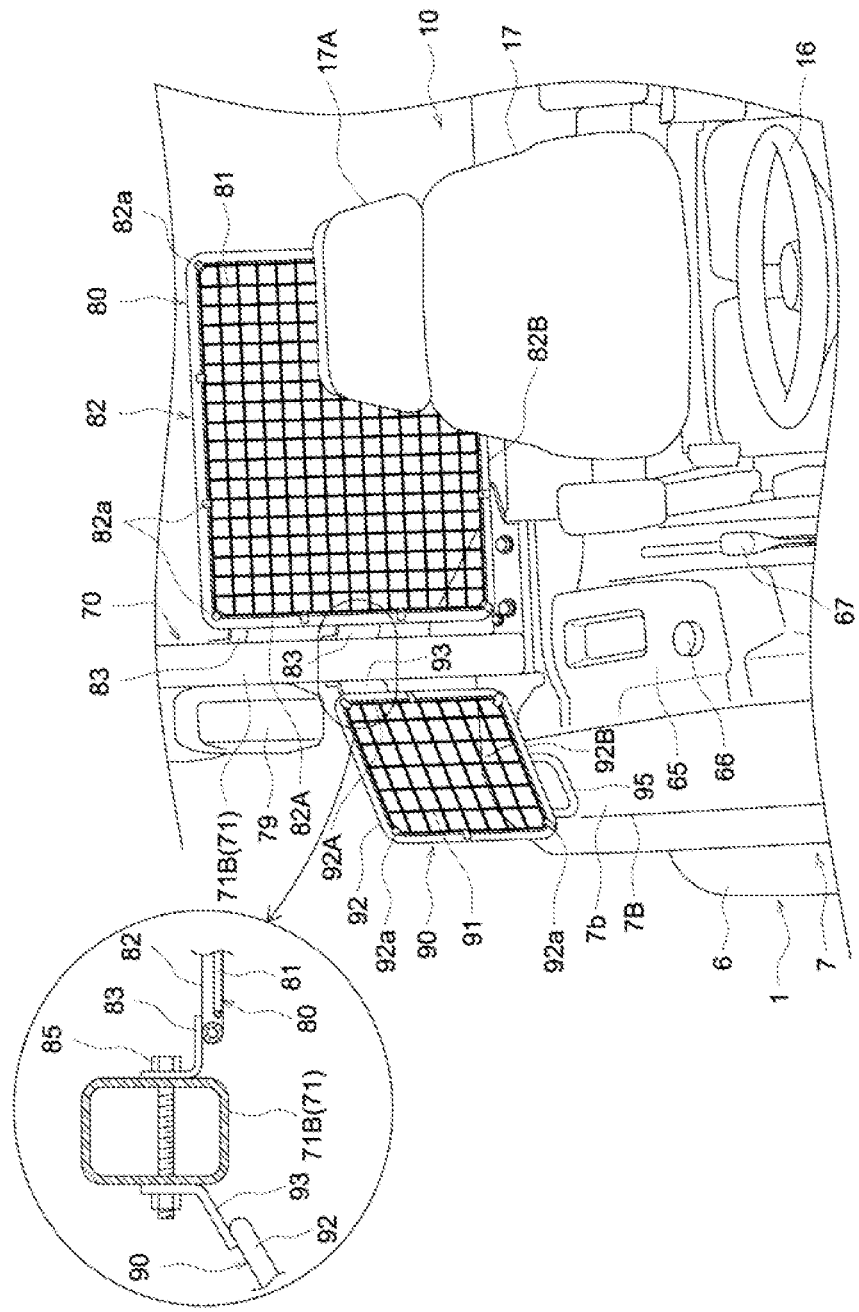
FIG. 9 is a perspective view of the rear partition wall structure of the tractor from a front view.

Further, as shown in FIGS. 2 and 9, a PTO on/off switch 66 and a lifting operation lever 67 are provided as an example of an operation tool for operating a working equipment provided on the vehicle body, at the right side column 65 provided in the upper portion of the fender 7 on the right side of the vehicle body and its vicinity. The PTO on/off switch 66 is a switch for turning on/off the power transmission of a PTO clutch (not shown). The lifting operation lever 67 is a lever for lifting the work device lifting mechanism 20.

As shown in FIG. 2, a parking brake lever 63 for switching each of braking devices (not shown) for the left and right rear wheels 6 between the braking state and the non-braking state is provided between the right side of the driver's seat 17 and the right fender 7 of the vehicle body.

Further, as shown in FIGS. 4 to 6, a traveling speed change lever 68 is disposed on the left side column 61.

Figure 8:
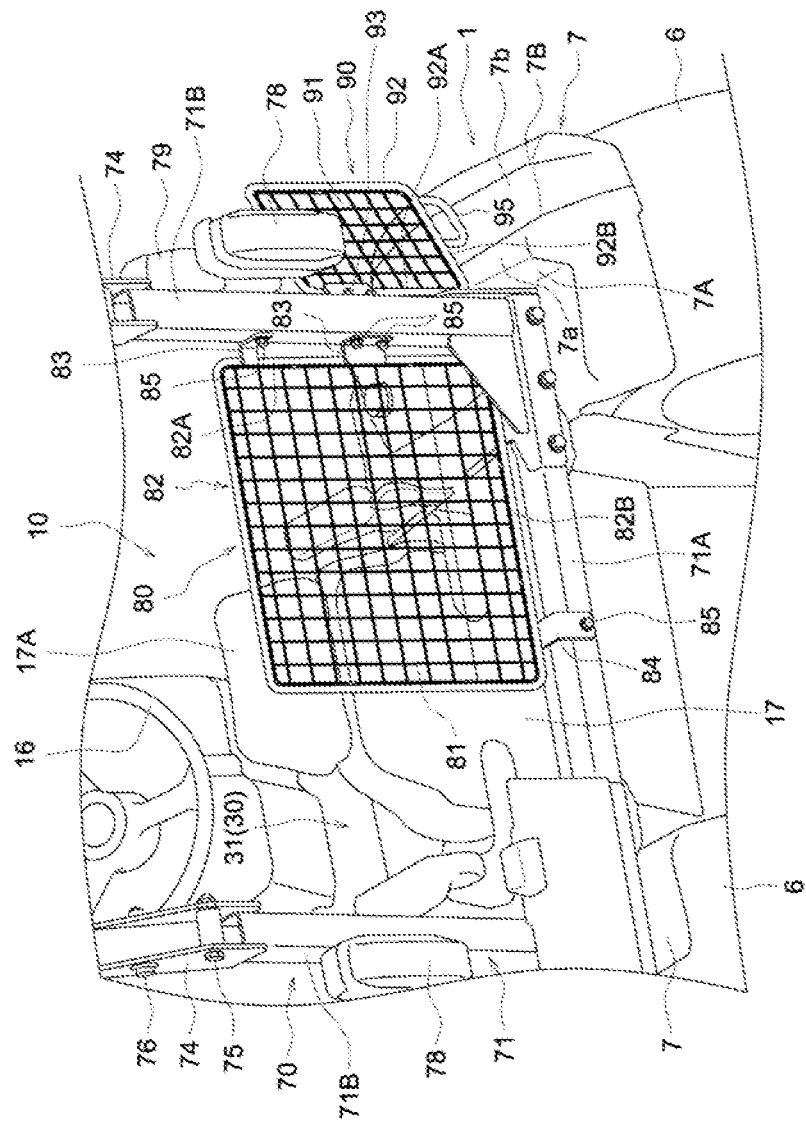
FIG. 8 is a perspective view of a rear partition wall structure of the tractor from a rear view.

As shown in FIGS. 3 and 8, a protection frame 70 is vertically provided on a base frame 69 extending upward from the rear part of the body frame 2 to protect the driver seated on the driver's seat 17 when the vehicle body rolls over. The protection frame 70 has a lower protection frame 71 fixed to the base frame 69, and an upper protection frame 72 foldably connected to the lower protection frame 71. The lower protection frame 71 has a horizontal frame portion 71A fixed to the upper end of the base frame 69 and extending along the left-right direction, and left and right lower prop frame portions 71B which are bolt-connected to both end portions of the horizontal frame portion 71A in an orientation along the up-down direction.

As shown in FIGS. 1 to 3, rear composite lamps 78 are mounted on the respective rear surface of the left and right lower prop frame portions 71B, to display a deceleration, a stop, a backward movement, a left-right rotation, or the like of the tractor 1 for a vehicle or a person behind the tractor 1. Each of the rear composite lamps 78 includes a tail lamp, a brake lamp, a reverse lamp, and a direction indicator lamp. Front composite lamps 79 for displaying the vehicle width of the tractor 1, the left-right rotation, or the like are mounted on the respective front surface of the left and right lower prop frame portions 71B for a vehicle or a person forward of the tractor 1. Each of the front composite lamps 79 includes a direction indicator lamp and a vehicle width lamp.

Further, a beacon lamp (low-speed vehicle indicator lamp) 73 is mounted on a horizontal frame portion 72B constituting an upper protection frame 72.

As shown in FIGS. 3 and 8 to 10, the upper protection frame 72 is formed to be bent in an inverted U shape when viewed in the front-rear direction. The lower end portion of the left and right upper prop frames 72A, which constitute the upper protection frame 72, is connected to a bracket 74, which is fixed to the upper end portion of the left and right lower prop frame portions 71B, so as to be swingable about a pivot pin 75 along the left-right direction. A fixing pin 76 is provided to the upper protection frame 72 so as to be insertable and withdrawable in order to fixedly hold the upper protection frame 72 in a protection orientation in which the upper protection frame 72 protrudes forward and upward, across the lower end portion of the upper prop frames 72A and the bracket 74 of both of the lower prop frame portions 71B. When the fixing pin 76 is pulled out, the upper protection frame 72 can swing rearward around the pivot pin 75, and the upper protection frame 72 can be changed to a folding orientation in which the upper protection frame 72 is folded toward the rear side of the lower protection frame 71.

Figure 10:
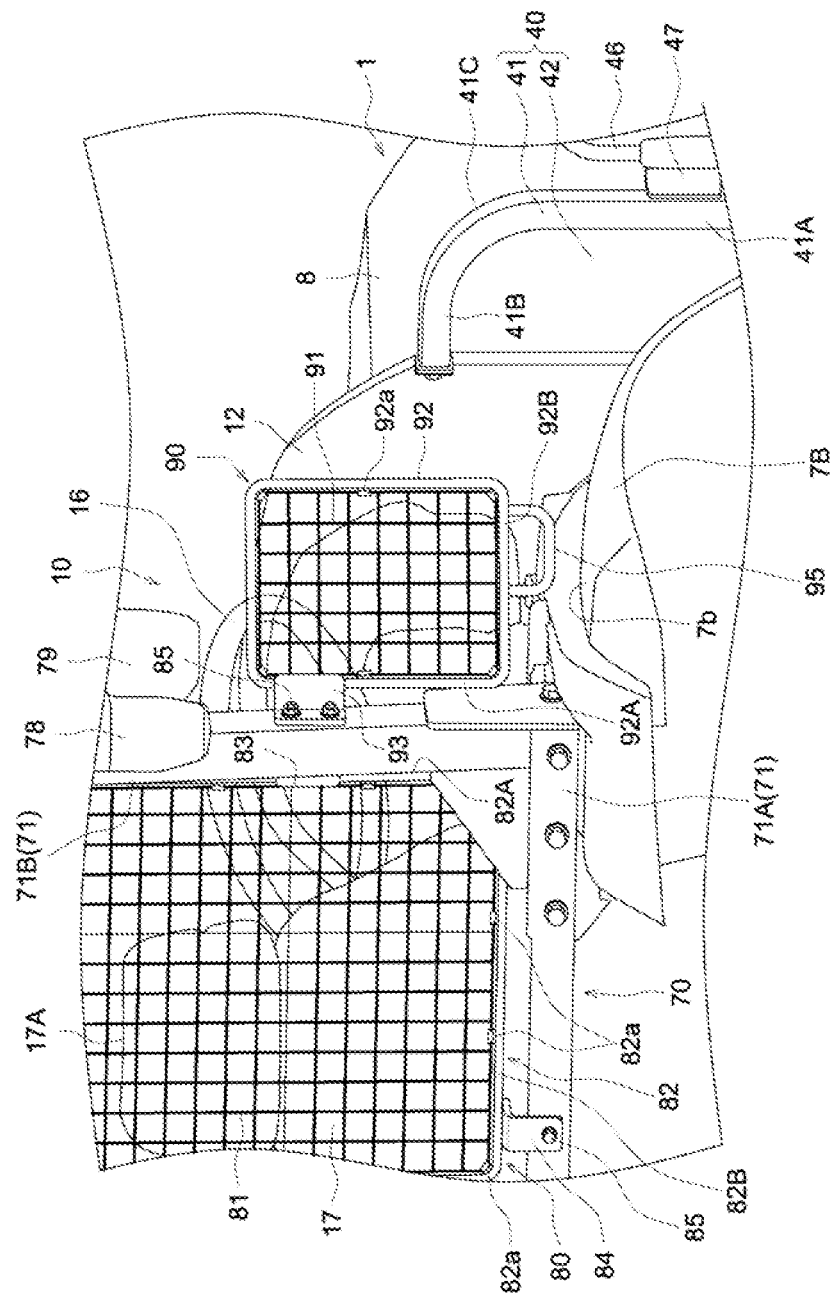
FIG. 10 is an enlarged rear view of the rear partition wall structure of the tractor.

As shown in FIGS. 8 to 10, in the rearward position of the driver's seat 17, a transparent partition wall 80, which is divided into a front region of the vehicle body defining the front side thereof and a rear region of the vehicle body defining the rear side thereof, is provided on the protection frame 70. The partition wall 80 includes a partition metal wire net 81 formed in a rectangular shape as viewed in the front-rear direction and having transparency and air permeability, and a metal partition holding frame 82 that sandwiches and holds the four sides of the partition metal wire net 81 with a plurality of holding pieces 82a to prevent the partition metal wire net 81 from slipping out.

The lateral width of the partition wall 80 in the left-right direction is configured with approximately the lateral width dimension extending from the inner surface inside the vehicle body of the lower prop frame portions 71B disposed on the right side of the vehicle body of the lower protection frame 71 to the position near the left end portion of the head portion 17A of the driver's seat 17. As shown in FIG. 3, the height of the partition wall 80 is configured with the approximately height dimension, that extends upward from the upper surface of the horizontal frame portion 71A of the lower protection frame 71 to a position above the head portion 17A of the driver's seat 17, and to an intermediate position in the up and down direction of the rear composite lamp 78 mounted on the lower prop frame portions 71B.

As shown in FIGS. 8 to 10, the partition wall 80 is provided offset toward the side where the PTO on/off switch 66 and the lifting operation lever 67 of the work device lifting mechanism 20, which are examples of the operation tool for operating the working equipment, are disposed relative to the driver's seat 17. Specifically, first mounting members 83, which are formed to be bent in an L-shape, are fixed to upper and lower portions of a vertical holding frame portion 82A on the right side of the vehicle body of a partition holding frame 82 of the partition wall 80. A second mounting member 84 formed to be bent in an L-shape is fixed to a position near the left end side of a lower holding frame portion 82B of the partition holding frame 82. Both of the first mounting members 83 of the partition wall 80 are detachably mounted on the lower prop frame portions 71B on the right side of the vehicle body of the lower protection frame 71 with a bolt 85. The second mounting member 84 of the partition wall 80 is detachably mounted on the horizontal frame portion 71A of the lower protection frame 71 with the bolt 85.

As described above, the PTO on/off switch (an example of the operation tool) 66 and the lifting operation lever (an example of the operation tool) 67 are collectively disposed on the right fender 7. The PTO on/off switch 66 is a switch for turning on/off the power transmission of a PTO clutch (an example of a working equipment) not shown. The lifting operation lever 67 is a lever for lifting and lowering a work device lifting mechanism (an example of the work device) 20. Therefore, at the rearward position of the driver's seat 17, when the partition wall 80 is provided to divide the front region of the vehicle body defining the frontward side thereof, and the rear region of the vehicle body defining the rear side thereof, the partition wall 80 can be provided offset toward the side, where the PTO on/off switch 66 and the like are provided, relative to the driver's seat. Accordingly, it is possible to configure the partition wall 80 to be shorter by the amount corresponding to the offset while avoiding inadvertent operation of and contact with the PTO on/off switch 66 and the lifting operation lever 67, caused by an operator's hand intruding from the rear region of the vehicle body through the lateral space on the right side of the driver's seat 17, specifically, by the operator's hand intruding through the lateral space between the lower prop frame portions 71B on the right side of the vehicle body of the lower protection frame 71 and the right end portion of the driver's seat 17.

Therefore, as a result of the above-mentioned rational placement in which the PTO on/off switch 66 and the lifting operation lever 67 are collectively disposed on the right fender 7, it is possible to improve the visibility on the rear side by shortening the partition wall 80, while to avoid the inadvertent operation of and contact with the PTO on/off switch 66 and the lifting operation lever 67 due to an operator's hand intruding from the rear region of the vehicle body through the lateral space on the right side of the driver's seat 17.

As shown in FIGS. 8 to 10, a side partition wall 90 is disposed so as to incline toward the front side of the vehicle body in a state where the side partition wall 90 projects farther outward of the vehicle body than the position where the PTO on/off switch 66 and the like are disposed, on the outer edge side of the partition wall 80 on the side where the PTO on/off switch 66 and the like are disposed. The side partition wall 90 has a side partition metal wire net 91 formed in a rectangular shape as viewed in the front-rear direction, and a metal side partition holding frame 92 that sandwiches and holds the four sides of the side partition metal wire net 91 with a plurality of holding pieces 92a to prevent the side partition metal wire net 91 from slipping out.

The lateral width of the side partition wall 90 in the left-right direction is configured with a substantially lateral width dimension that extends from the outer surface on the outer side of the vehicle body of the lower prop frames 71B, which is disposed on the right side of the vehicle body of the lower protection frame 71, to a position near the outer end portion of the right fender 7, or a lateral width dimension that is slightly smaller than the substantially lateral width dimension. Therefore, in a state in which the side partition wall 90 is mounted on the lower prop frame 71B provided on the right side of the vehicle body, the side partition wall 90 largely extends outward from the outer surface of the lower prop frame 71B to a position near the outer end of the right fender 7 outward of the vehicle body.

Further, the height of the side partition wall 90 is configured with a height dimension, which is slightly smaller than the distance between the upper surface of the right fender 7 and the lower end of the rear composite lamp 78 mounted on the right lower prop frame portions 71B. Therefore, in a state where the side partition wall 90 is mounted on the lower prop frame portions 71B disposed on the right side of the vehicle body, the upper end of the side partition wall 90 is close to the lower end of the rear composite lamp 78, and the space between the side partition wall 90 and the rear composite lamp 78 is small. Therefore, it is possible to prevent an operator's hand from intruding through the gap between the upper end of the side partition wall 90 and the lower end of the rear composite lamp 78 from the rear region of the vehicle body to the PTO on/off switch 66 or the like.

As shown in FIGS. 8 and 10, on the upper surface of the right fender 7, the highest position is the upper surface 7a of a ridge 7A that is bulged upward at the center in the width direction and on the outer side of the lower prop frame portions 71B on the right side of the vehicle body in the lower protection frame 71. Further, the upper surface 7b of an outer fender portion 7B located outward of the vehicle body with respect to the ridge 7A is located at a position lower than the upper surface 7a of the ridge 7A. Therefore, the gap between the lower holding frame portion 92B of the side partition holding frame 92 and the upper surface 7b of the outer fender portion 7B of the right fender 7 becomes large. Therefore, there is a possibility that an operator's hand intrudes through the gap from the rear region of the vehicle body to the PTO on/off switch 66 or the like.

In order to prevent such intrusion, according to the present invention, as shown in FIGS. 8 to 10, a protrusion portion 95 is provided on the lower holding frame portion 92B of the side partition holding frame 92 in order to reduce the gap with the upper surface 7b of the outer fender portion 7B of the right fender 7. The protrusion portion 95 is formed of a rod-shaped or pipe-shaped partition frame formed to be bent in a flat "U" shape in a rear view.

As described above, the gap is provided between the side partition wall 90 and the upper surface of the right fender 7, and noise and deformation due to the contact between the side partition walls 90 and the fender 7 having different vibration characteristics are suppressed. Further, the protrusion portion 95 provided at the lower end portion of the side partition wall 90 reduces the gap between the lower holding frame portion 92B of the side partition holding frame 92 in the side partition wall 90, and the upper surface 7b of the outer fender portion 7B in the right fender 7. As a result, it is possible to suppress the intrusion into the PTO on/off switch 66 and the like, which uses the gap on the lower side of the side partition wall 90 as a bypass passage.

As shown in FIGS. 8 to 10, a third mounting member 93 is fixed so as to formed to be bent in a substantially "V" shape (see FIG. 9) in a plan view, on the upper portion of the vertical holding frame portion 92A on the inner side of the vehicle body in the side partition holding frame 92 of the side partition wall 90. The third mounting member 93 is formed to be bent at an obtuse angle by an angle at which the side partition wall 90 inclines forward and outward of the vehicle body.

The third mounting member 93 of the side partition wall 90 is detachably mounted on the outward side surface on the outer side of the vehicle body of the lower prop frame portion 71B, which is disposed on the right side of the vehicle body of the lower protection frame 71, with the bolt 85. The third mounting member 93 of the side partition wall 90 and the first mounting member 83 on the lower side of the partition wall 80 are fastened and fixed with the bolt 85. Further, the first mounting member 83 on the upper side of the partition wall 80 is fastened and fixed with the rear composite lamp 78 with the bolt 85.

As described above, the side partition wall 90, which is disposed on the outer edge side of the partition wall 80 on the side where the PTO on/off switch 66 and the like are disposed, protrudes outward of the vehicle body more than the installation position of the PTO on/off switch 66 and the like, and is inclined toward the front side of the vehicle body. Therefore, in order to reroute an operator's hand from intruding from the lateral outward side of the vehicle body from the rear region of the vehicle body, to the PTO on/off switch 66 or the like, it is necessary for the operator's hand to be rerouted largely frontward and outward of the vehicle body. As a result, it is possible to effectively prevent the operator's hand from intruding from the rear region of the vehicle body by rerouting to the lateral outward side of the vehicle body.

In order to reroute an operator's hand the lateral outward side of the vehicle body from the rear region of the vehicle body of the driver's seat 17, to the PTO on/off switch 66 or the like, it is necessary to reroute the operator's hand farther frontward and outward than the lower prop frame portions 71B, by the amount that the side partition wall 90 protrudes more toward the outward side of the vehicle body than the lower prop frame portions 71B of the lower protection frame 71. Accordingly, it is possible to effectively prevent an operator's hand from by rerouting the intrusion to the lateral outward side of the vehicle body from the rear region of the vehicle body.

Further, as described above, the partition wall 80 and the side partition wall 90 are configured to be detachable. Therefore, it is possible to easily perform maintenance for the partition wall 80 and the side partition wall 90 themselves, and maintenance for the vehicle body side on which the partition wall 80 and the side partition wall 90 are disposed.

In the above-described embodiment, the partition wall 80 and the side partition wall 90 are made of a metal mesh, but may be made of a porous plate such as expanded metal, a resin plate such as a transparent acrylic plate, or the like.

Second Embodiment

Figure 11:
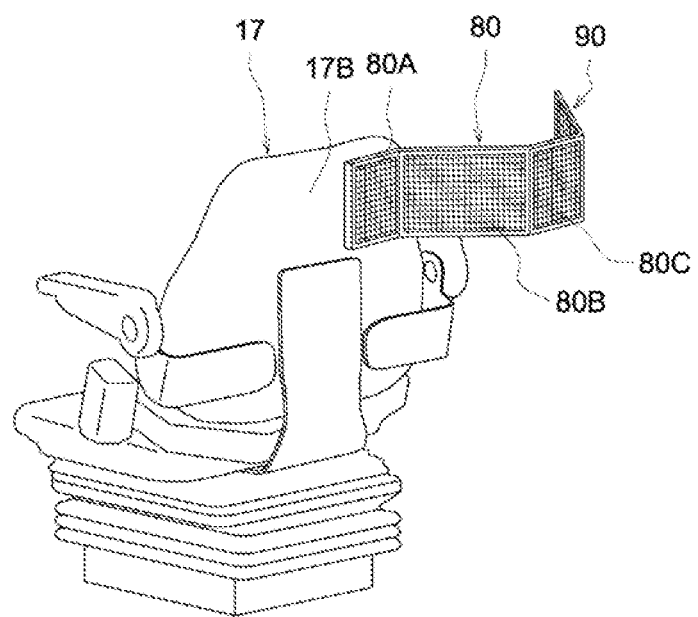
FIG. 11 is a perspective view of a driver's seat and a rear partition wall structure of another embodiment.
Figure 12:
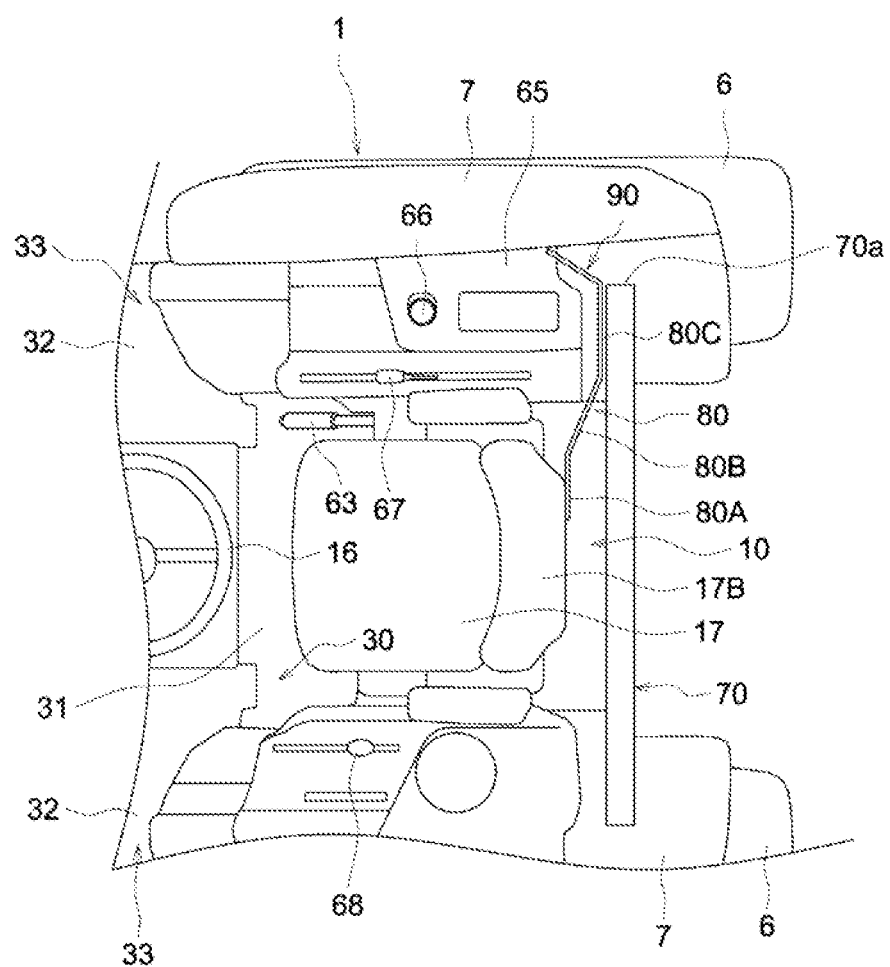
FIG. 12 is a plan view when the driver's seat and the rear partition wall structure are disposed at the rearmost position.
Figure 13:
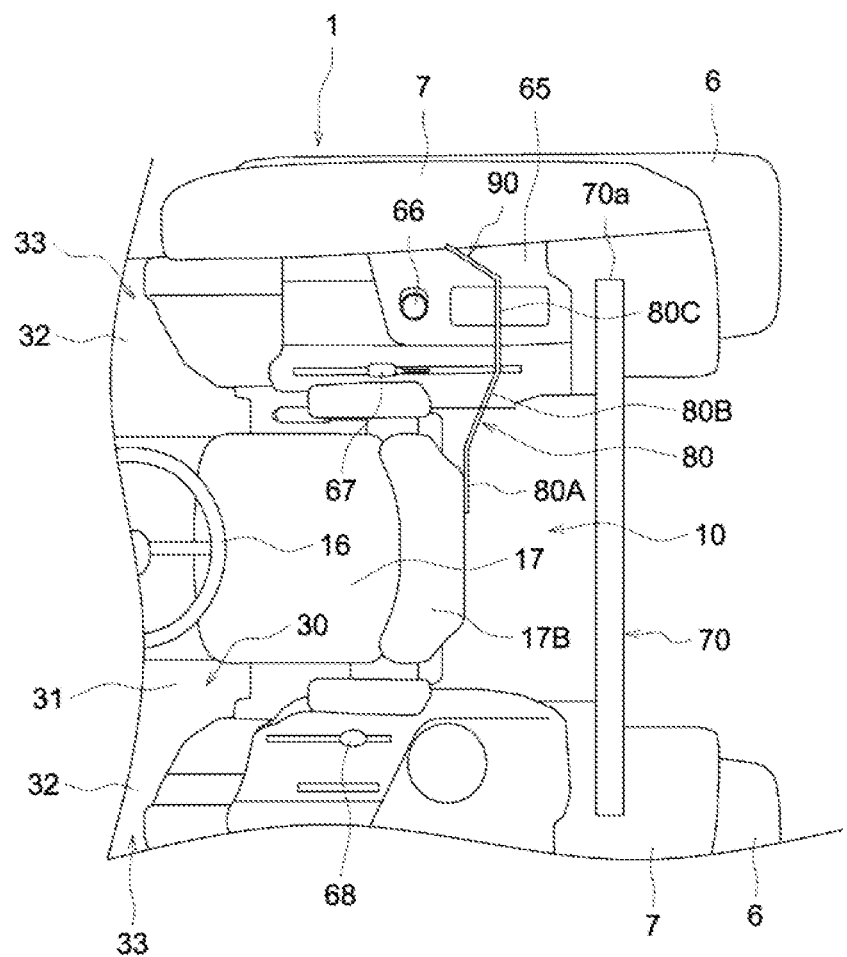
FIG. 13 is a plan view when the driver's seat and the rear partition wall structure are disposed at the frontmost position.

In the tractor 1 as an example of the work vehicle shown in FIGS. 11 to 13, at the rearward position of the driver's seat 17, the partition wall 80 partitioning into the front region of the vehicle body on the front side thereof, and the rear region of the vehicle body on the rearward thereof, and the side partition wall 90 that inclines toward the front side of the vehicle body in a state of projecting more toward the outward side of the vehicle body than the installation position of the PTO on/off switch 66 and the like are mounted on the backrest frame (not shown) of the backrest portion 17B of the driver's seat 17.

The partition wall 80 includes a mounting base portion 80A, an inclined partition wall portion 80B, and a lateral partition wall portion 80C. The mounting base portion 80A is mounted on the right end portion of the back surface of the backrest portion 17B of the driver's seat 17 along the left-right direction. The inclined partition wall portion 80B extends obliquely from the right end of the mounting base portion 80A toward the rearward of the vehicle body on the outward side of the vehicle body. The lateral partition wall portion 80C extends from the right end of the inclined partition wall portion 80B along the left-right direction outward of the vehicle body. The mounting base portion 80A, the inclined partition wall portion 80B, and the lateral partition wall portion 80C of the partition wall 80 are integrally formed of a material having air permeability and transparency such as a wire metal mesh or a perforated plate.

As shown in FIG. 12, the right end of the lateral partition wall portion 80C of the partition wall 80 is disposed on the outer surface 70a or the vicinity thereof on the right end side of the vehicle body in the protection frame 70. Therefore, the side partition wall 90, which is integrally formed on the right end side of the lateral partition wall portion 80C of the partition wall 80, is disposed so as to project largely toward the front side of the vehicle body outward of the vehicle body more than the outer surface 70a of the protection frame 70 on the right end side of the vehicle body.

The partition wall 80 and the side partition wall 90 move integrally with the driver's seat 17 that is adjusted in the front-rear direction. The side partition wall 90 is made of a material having air permeability and transparency such as a wire metal mesh and a perforated plate, similarly to the partition wall 80.

FIG. 12 shows a state in which the seat position of the driver's seat 17 is located at the rearmost end within an adjustable range. In that state, the lateral partition wall portion 80C of the partition wall 80 is in a position close to the front surface of the protection frame 70 in a plan view.

FIG. 13 shows a state in which the seat position of the driver's seat 17 is located at the foremost end within the adjustable range. In that state, the inclined partition wall portion 80B of the partition wall 80 and the outer surface on the right end side of the vehicle body partition the rear side of the vehicle body of the PTO on/off switch 66 and the lifting operation lever 67 of the work device lifting mechanism 20, which are examples of the operation tool for operating the working equipment. Further, the side partition wall 90 partitions the rearward and outward side of the vehicle body from the installation position of the PTO on/off switch 66 and the lifting operation lever 67.

Regardless of the position adjustment of the driver's seat 17 in the front-rear direction, it is possible to always maintain in a constant placement relationship among the driver's seat 17, the partition wall 80 disposed at the rearward of the driver's seat 17, and the side partition wall 90 that projects obliquely toward the forward and outward of the vehicle body. As a result, it is possible effectively suppress an operator's hand both intruding from the rear region of the vehicle body through the lateral space on the right side of the driver's seat 17, and intruding from the rear region of the vehicle body by rerouting the operator's hand to the lateral outward side of the vehicle body.

Second Example of First or Second Embodiments Described Above

Figure 14:
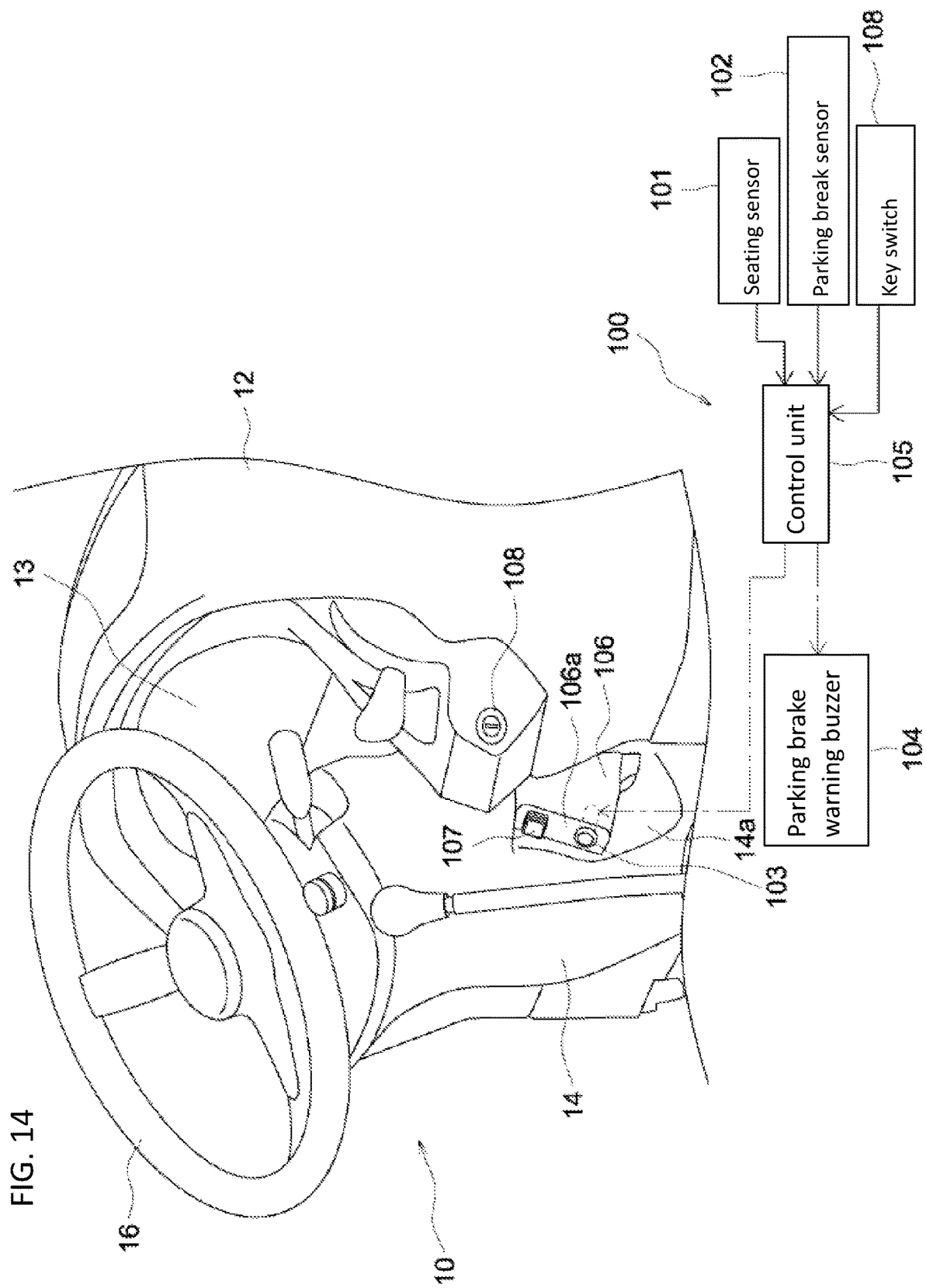
FIG. 14 is a perspective view of the right side portion of a driving portion of a tractor showing a second embodiment.

FIG. 14 shows a right side portion of the driving portion 10 of the tractor 1 in which the boarding section 33 located on the right side of the vehicle body of the left and right boarding sections 33 (see FIG. 2) is configured as a main doorway. The tractor 1 is equipped with a parking brake warning device 100 which operates when a driver forgets to operate the parking brake lever 63 in a braking state and moves away from the driver's seat 17 (for example, when deboarding). The parking brake warning device 100 includes a seating sensor 101 for detecting a seated state and a non-seated state of a driver on the driver's seat, a parking brake sensor 102 for detecting a braking state and a braking release state of the parking brake lever 63, and a parking brake warning lamp 103 and a parking brake warning buzzer 104 that operate when the parking brake lever 63 is in the braking release state in the non-seated state. The parking brake warning lamp 103 is provided at the side portion of the vehicle body, like the parking brake lever 63.

The signals from the seating sensor 101 and the parking brake sensor 102 are input to a control unit 105 that controls various kinds of devices mounted on the tractor 1. When the control unit 105 determines that an operator is in the non-seated state apart from the driver's seat 17 based on the signal from the seating sensor 101, and the parking brake lever 63 is in the braking release state based on the signal from the parking brake sensor 102, the control unit 105 blinks the parking brake warning lamp 103 and, at the same time, outputs a control signal for ringing the parking brake warning buzzer 104.

Further, a box-shaped wiring decoration cover 106 is provided in a recess 14a formed on the right side surface of the steering column 14 to cover wirings. The cover surface 106a on the rear part side of the wiring decoration cover 106 is provided in an inclined orientation positioned further forward toward the upper end side of the vehicle body in a state the cover surface 106a faces the driver's seat 17 side. A switch 107 for lighting an optional lamp (for example, the beacon lamp 73) and the parking brake warning lamp 103 are provided on both upper and lower sides of the cover surface 106a in the inclined orientation. The cover surface 106a of the wiring decoration cover 106 on which the parking brake warning lamp 103 is mounted is located at a position easily visible from the deboarding position on the right outer side of the driving portion 10 of the tractor 1. Therefore, it is possible to confirm surely visually the blinking parking brake warning lamp 103.

The control unit 105 inputs a signal indicating the ON/OFF state of a key switch 108 disposed on the right position of the steering column 14. In case that the control unit 105 determines that an operator is in the non-seated state away from the driver's seat 17 based on the signal from the seating sensor 101, and the parking brake lever 63 is in the braking release state based on the signal from the parking brake sensor 102, when the control unit 105 recognizes the engine stop operation by the operator by operating the key switch 108 from ON to OFF, the control unit 105 maintains the parking brake warning lamp 103 blinking and the parking brake warning buzzer 104 ringing until a set time (for example, 30 seconds) elapses after the key switch 108 is turned off.

Figure 15:
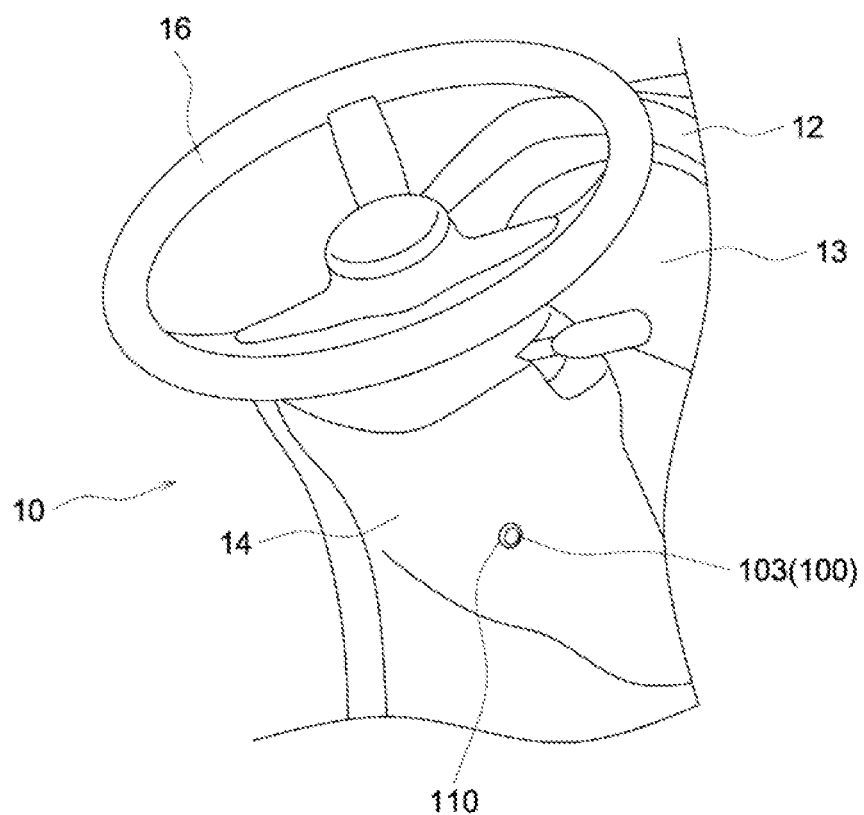
FIG. 15 is a perspective view of the right side portion of a driving portion of a tractor showing a modification of the second embodiment.

FIG. 15 shows a modified example of the second embodiment described above. In the modified example, a lamp mounting hole 110 for exposing the parking brake warning lamp 103 to the outside is formed on the right side surface of the steering column 14, and the parking brake warning lamp 103 is mounted in the lamp mounting hole 110.

In the above modified example, the wiring decoration cover 106 described in the second embodiment does not exist. Therefore, it is possible to reduce the number of parts and increase the space for the underbody operation.

Other Embodiments (1) According to the first embodiment described above, the height of the side partition wall 90 is configured to be lower than that of the partition wall 80 because the upper end of the side partition wall 90 is disposed close to the lower end of the rear composite lamp 78. However, the present embodiment is not limited to the configuration. For example, the height of the side partition wall 90 may be configured to be the same as the height of the partition wall 80, and a notch for mounting the rear composite lamp 78 may be formed in the side partition wall 90.

(2) According to each of the embodiments described above, the side partition wall 90 is disposed in the inclined orientation toward the front side of the vehicle body in a state of projecting toward the outward side of the vehicle body with respect to the installation position of the PTO on/off switch 66 or the like. However, the present embodiment is not limited to the configuration. For example, the side partition wall 90 may be disposed so as to project toward the outward side of the vehicle body in an orientation along the left-right direction. Further, the side partition wall 90 may be extended in an inclined orientation toward the rear side of the vehicle body in a state of being projected outward side of the vehicle body with respect to the installation position of the PTO on/off switch 66 and the like.

(3) According to each of the embodiments described above, the side partition wall 90 is provided so as to project toward the outward side of the vehicle body with respect to the installation position of the PTO on/off switch 66 and the like. However, only the partition wall 80 may be provided without providing the side partition wall 90.

(4) According to the second embodiment described above, the partition wall 80 and the side partition wall 90 are mounted on the driver's seat 17 in an integrally movable state. However, the present embodiment is not limited to the configuration. For example, the partition wall 80 and the side partition wall 90 may be mounted on the frame portion around the driver's seat 17 so as to be movable in the front-rear direction, and an interlocking mechanism may be provided to move the partition wall 80 and the side partition wall 90 in the front-rear direction in conjunction with the position adjustment of the driver's seat 17.

INDUSTRIAL APPLICABILITY

The present invention can be applied to various kind of work vehicles having a driver's seat disposed in the rear part of a vehicle body.

DESCRIPTION OF REFERENCE NUMERALS

7 FENDER
17 DRIVER'S SEAT
20 WORK DEVICE (WORK DEVICE LIFTING MECHANISM)
66 OPERATION TOOL (PTO ON/OFF SWITCH)
67 OPERATION TOOL (LIFTING OPERATION LEVER)
70 PROTECTION FRAME
71B PROP FRAME PORTION (LOWER PROP FRAME PORTION)
80 PARTITION WALL
90 SIDE PARTITION WALL
95 PROTRUSION PORTION

The invention claimed is:

1. A work vehicle comprising:
a driver's seat disposed in a rear part of a vehicle body;
a left and a right fender disposed on left and right lateral outer sides of the driver's seat, respectively; and
a partition wall that divides, at a position behind the driver's seat, a front region of the vehicle body on a front side of the driver's seat and a rear region of the vehicle body on a rear side of the driver's seat from each other,
wherein an operation tool for operating working equipment provided on the vehicle body is disposed on one of the fenders,
wherein the partition wall is provided offset toward a side, where the operation tool is disposed, relative to the driver's seat, and
wherein on an outer edge side of the partition wall on the side, where the operation tool is disposed, a side partition wall is disposed to incline toward the front side of the vehicle body while protruding toward an outer side with respect to the vehicle body farther than an installation position of the operation tool.

2. The work vehicle according to claim 1,
wherein the partition wall is attached in a protection frame vertically provided in the rear part of the vehicle body, and
wherein the side partition wall is attached to a prop frame portion of the protection frame on the side, where the operation tool is disposed, while protruding toward the outer side with respect to the vehicle body farther than the prop column frame.

3. The work vehicle according to claim 1,
wherein the partition wall and the side partition wall are each detachable.

4. The work vehicle according to claim 1,
wherein a protrusion portion is provided on a portion of the side partition wall that faces one of the fenders, the protrusion portion reducing a gap between the portion of the side partition wall and an upper surface of that fender.

5. The work vehicle according to claim 1,
wherein the partition wall and the side partition wall are provided at the driver's seat.

* * * * *